(12) United States Patent
Gupta et al.

(10) Patent No.: US 8,787,480 B2
(45) Date of Patent: Jul. 22, 2014

(54) METHOD OF DETERMINING CHANNEL STATE INFORMATION

(75) Inventors: Chandra-Prakash Gupta, Bochum (DE); Martin Kosakowski, Bochum (DE); Ernst Slawomir Zielinski, Bochum (DE)

(73) Assignee: BlackBerry Limited, Waterloo, Ontario (CA)

( * ) Notice: Subject to any disclaimer, the term of this patent is extended or adjusted under 35 U.S.C. 154(b) by 453 days.

(21) Appl. No.: 13/217,043

(22) Filed: Aug. 24, 2011

(65) Prior Publication Data

US 2013/0051490 A1 Feb. 28, 2013

(51) Int. Cl.
*H04B 7/02* (2006.01)
*H04L 27/06* (2006.01)
*H04B 7/06* (2006.01)
*H04L 25/03* (2006.01)
*H04L 1/00* (2006.01)
*H04L 27/26* (2006.01)

(52) U.S. Cl.
CPC ............... *H04L 25/03* (2013.01); *H04L 1/0026* (2013.01); *H04L 27/2647* (2013.01); *H04B 7/0639* (2013.01); *H04L 1/0031* (2013.01); *H04B 7/063* (2013.01)
USPC ......................................... 375/267; 375/340

(58) Field of Classification Search
USPC .................................................. 375/267, 340
See application file for complete search history.

(56) References Cited

U.S. PATENT DOCUMENTS

2011/0268073 A1* 11/2011 Jian et al. ...................... 370/329
2013/0201912 A1* 8/2013 Sheng et al. .................. 370/328

* cited by examiner

*Primary Examiner* — Don N Vo
(74) *Attorney, Agent, or Firm* — Fish & Richardson P.C.

(57) ABSTRACT

A method for estimating channel state information (CSI) for a communication channel is disclosed. Theoretical channel capacities are calculated using combinations of rank indicator (RI) and precoding matrix index (PMI) values. A number of these theoretical channel capacities are selected and used for determining an optimum combination of channel quality indicator (CQI) values, RI values and PMI values. This combination of values is subsequently transmitted as CSI.

27 Claims, 8 Drawing Sheets

METHOD OF DETERMINING CHANNEL STATE INFORMATION

TECHNICAL FIELD

This invention relates to a method of determining channel state information (CSI) for use in link adaptation within wireless communication systems.

BACKGROUND

The process of dynamically optimising signal and protocol parameters for a given instantaneous channel condition is known as link adaptation. With the example of an enhanced Node B (eNb) base station communicating with a user equipment (UE), the link adaptation process involves the UE sending feedback information to the eNb with details of the channel conditions. By doing so, the eNb can adjust its transmission parameters to achieve the greatest throughput without surpassing a predetermined error threshold. The effectiveness of the link adaptation process is dependent on both the accuracy of this feedback information and how rapidly it can be calculated and sent. If the eNb is provided with frequent and accurate feedback information it will be able to pick the best possible transmission parameters for that moment and rapidly alter them as required.

CSI may be used as the feedback information in the link adaptation process. CSI includes three separate indicators that are particularly useful when the wireless system is capable of utilising multiple-input multiple-output (MIMO) systems, such as those used in the Long Term Evolution (LTE) standard (or other modern wireless communication standards like HSPA+, 4G, WiMax and IEEE 802.11n). These three indicators found in CSI are:
1. Rank Indicator (RI). The RI reflects the maximum number of spatially parallel transmissions supported by the channel that can be efficiently exploited by the detector or receiver. It informs the eNb whether a higher throughput link (higher rank) should be used over a more reliable link (lower rank). The RI is an indicator of rank.
2. Precoding Matrix Indicator (PMI). The PMI signals the codebook index of the precoding matrix that should be applied at the eNb. The PMI is an indicator of precoding.
3. Channel Quality Indicator (CQI). Formerly referred to as modulation and coding scheme (MCS), the CQI indicates the recommended MCS selection for the given modulation (such as QPSK, 16 QAM and 64 QAM) and code rate (e.g. $1/10$, $1/3$, $1/2$, $3/4$, $9/10$ etc.) alphabet. The CQI is an indicator of channel quality.

DESCRIPTION OF THE DRAWINGS

Examples of the proposed approach will now be described in detail with reference to the accompanying drawings, in which.

DETAILED DESCRIPTION

Figure 1:
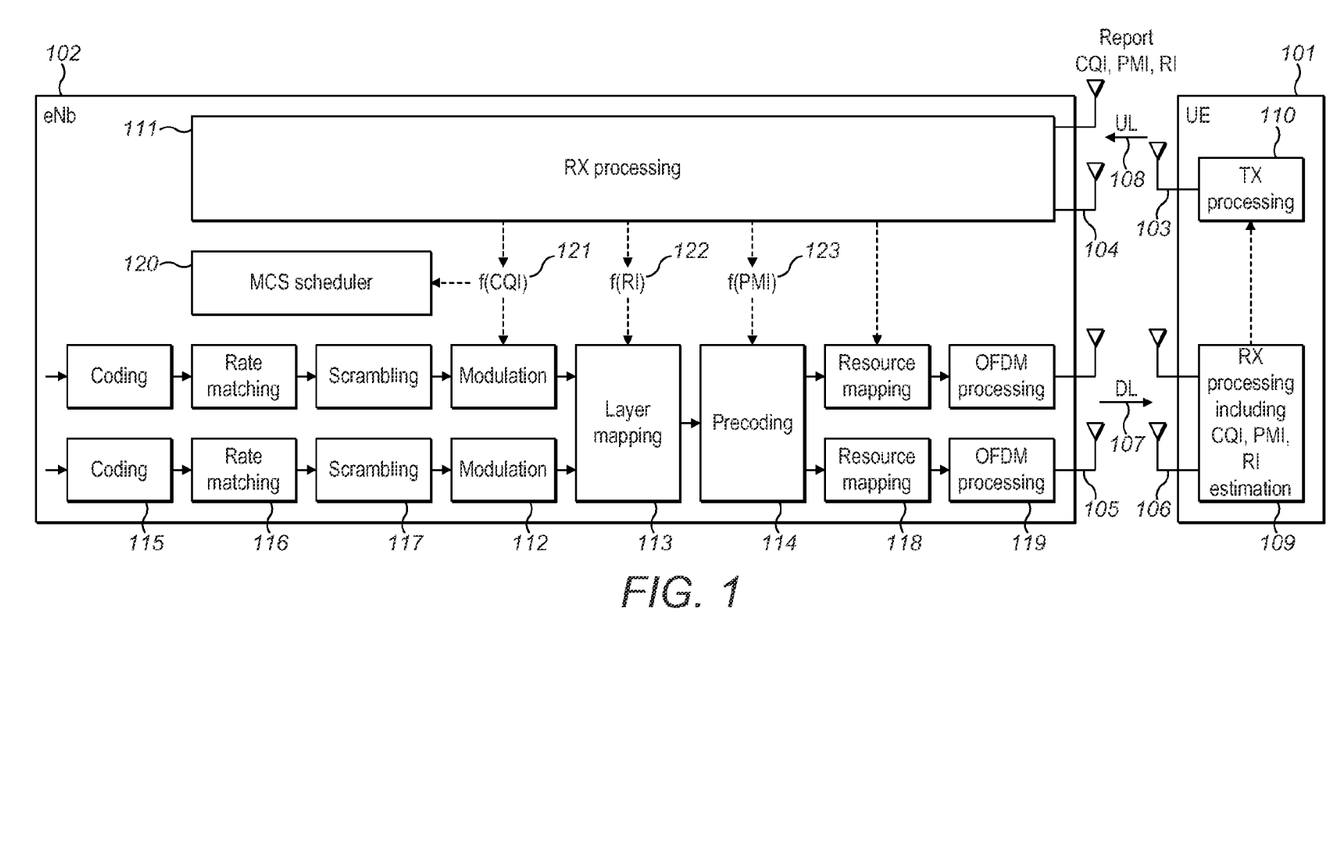
FIG. 1 is a simplified block diagram of the processes performed in an eNb and UE implementing a link adaptation process.

FIG. 1 shows an eNb 102 in wireless communication with a UE 101 for the purpose of providing an overview of a link adaptation process for LTE. However, the link adaptation process need not be limited to the exemplary case shown, but can be between any wireless devices, such as between two UE's or two eNb's.

The UE 101 detects a signal 107, sent from the transmitting antenna(s) 105 of the eNb 102, with its own receiving antenna(s) 106. Once the signal 107 has been received, it is processed at the RX processing stage 109 by the UE 101. During this processing stage 109, the UE performs a decision on what CSI, comprising of RI, PMI and CQI, to send to the eNb 102. Once this decision has been made, these parameters are sent to the TX processing stage 110 of the UE 101, where they are transmitted to the eNb 102 via the transmitter antenna(s) 103 of the UE 101 to the receiver antenna(s) 104 of the eNb.

Upon receiving the uplink signal 108 from the UE 101, the eNb 102 processes it at the RX processing stage 111, where it extracts the RI, PMI and CQI values sent by the UE 101. Depending on the reporting mode the CQI and the PMI values reported by the UE can be either wideband (full bandwidth) related or sub-band (part of the full bandwidth) related, whereas the RI reported by the UE is always wideband related. The eNb 102 may use the extracted RI, PMI and CQI values as the transmission parameters it uses for further wireless transmissions 107 to the UE 101 by setting the parameter at the modulation stage 112 to be the received CQI value, the parameter at the layer mapping stage 113 to be the received RI value and the parameter at the precoding stage 114 to be the received PMI value. The eNb 102 may also use the received CQI value at the MCS scheduler stage 120 to more effectively schedule transmissions. With these transmission parameters received at the eNb, the data to be sent, which has already gone through the steps of coding 115, rate matching 116 and scrambling 117, is processed at the modulation 112, layer mapping 113 and precoding 114 stages with optimised transmission parameters, before entering the resource mapping 118 and OFDM processing 119 stages for sending through transmitter antenna(s) 105. The resource mapping 118 stage may also take into account the transmission parameters when mapping resources before entry into the OFDM processing 119 stage.

Rather than directly use the CQI, RI and PMI values received from the UE 101, the eNb 102, may use the result of a function (121, 122, 123) of these values to set the transmission parameters. This function may, for example, take into account the values received from other UEs, as an eNb 102 may have to schedule several UEs within its cell range at the same time, which means it cannot necessarily guarantee an optimal data schedule for each UE at any time. Therefore a result of this function may be that the value received from the UE 101 is not used at all when setting the transmission parameters.

While FIG. 1 shows a UE 101 reporting recommended RI, PMI and CQI data to the eNb 102 for improved transmission from the eNb 102, there may be implementations where it is the eNb 102 that reports to the UE 101 recommended RI, PMI and CQI data for improved transmission from the UE 101. This reporting by the eNb 102 may be performed instead of the reporting by the UE 101 or in addition to.

At the RX processing stage 109 of the UE 101, RI, PMI and CQI values are estimated based on the current channel conditions as detected at the receiver antenna(s) 106 of the UE 101. In order to estimate the RI, the UE 101 determines channel matrices from the downlink signal 107 it receives from the eNb 102 and performs calculations on them.

The rank of the channel matrix may be found by determining the number of non-zero Eigen values of the matrix, giving the number of independent links the channel can support. The RX processing stage 109 may do this by simply finding the determinant of the channel matrix. It may use an alternative, condition-based approach, where the singular values of the matrix are calculated and the ratio of the maximum to minimum singular provides a condition number, which can indicate whether a channel would suffer from higher error rates with higher ranks. Both of these approaches only take channel estimates into account, and therefore the rank indication is dependent on a threshold found by extensive simulations.

An improved method of determining rank takes the signal-to-noise ratio (SNR) into account as well as channel estimates, in order to calculate channel capacities. The channel capacity is the maximum number of bits which a channel can carry under a given SNR at the receiver. In contrast to the mutual information approach of joint CQI/PMI/RI searches, the channel capacity is equal to or larger than the maximum mutual information. Therefore a simple link between channel capacity and mutual information can be defined as:

Cap=max(mutual information)

Different calculations are performed to determine channel capacity, depending on whether channel capacity is being determined for a MIMO mode (spatial multiplexing mode where rank>1) or a transmitter diversity (TxDiversity) mode (where rank=1).

Channel capacity is calculated for the MIMO mode by using the equation:

$$Cap_{MIMO} = \log_2\left(\det\left(I + \frac{E_s}{M_T N_0} HH^H\right)\right)$$
$$= \sum_{i=1}^{r} \log_2\left(1 + \frac{E_s}{M_T N_0} \lambda_i\right)$$

where $E_S$ is signal energy, $M_T$ is the number of transmitter antennas, $N_0$ is noise power and $\lambda_i$ are the Eigen values of channel estimates ($HH^H$) and r is the number of non-zero Eigen values.

To calculate channel capacities for the TxDiversity mode, the following equation is used:

$$Cap_{TxDiversity} = \log_2\left(I + \|H\|_F^2 \frac{E_s}{M_T N_0}\right)$$

where $\|H\|_F^2 = \text{trace}(HH^H)$ is the Frobenius norm of the channel estimates.

In instances where sub-optimum detectors are used for receiving signals, the SNR is further reduced and with it the maximum achievable mutual information. In these instances, which in reality would be for most, post-detector SNR may be taken into account when calculating channel capacities.

The calculation for determining channel capacity of a spatial multiplexing mode where a Zero-Forcing (ZF) detector is used, employs a modified post-detector SNR value given by:

$$SNR_{ZF} = \frac{|\text{diag}(H^H H)|}{\sigma_n^2}$$

This value for post-detector SNR is used in the following modified equation for calculating channel capacity of spatial multiplexing with a ZF detector:

$$Cap_{SM-ZF} = \sum_{i=1}^{r} \log_2(1 + SNR_{ZF,i})$$

The calculation for determining channel capacity of a spatial multiplexing mode where a Minimum Mean Square Error (MMSE) detector is used, employs a modified post-detector SNR value given by:

$$SNR_{MMSE} = \frac{1}{|\text{diag}(I - WH)|}$$
$$\text{where, } W = (H^H H + \sigma_n^2 * I)^{-1} H^H$$

This value for post-detector SNR is used in the following modified equation for calculating channel capacity of spatial multiplexing with a MMSE detector:

$$Cap_{SM-MMSE} = \sum_{i=1}^{r} \log_2(1 + SNR_{MMSE,i})$$

Different from detector independent strategies, these rank indication strategies, which take the SNR and the receiver capabilities (post equaliser SNR) into account, represent more accurate RI strategies.

Therefore, for each given transmission scenario, the RX processing stage 109 determines a theoretical channel capacity for either MIMO or TxDiversity modes or both. Where the maximum rank the wireless network can support is 2 (such as the case where there are only two antennas at both the receiver and transmitter), by comparing channel capacities for MIMO and TxDiversity modes, a decision is made as to whether the current channel can support spatial multiplexing (SM) or TxDiversity mode. The TxDiversity mode is more reliable than SM mode at the expense of a lower data rate, hence its capacity is usually lower.

However, the wireless networks may allow for ranks above 2, in some instances 4 and in others even higher. The proposed approach is capable of choosing between more than two choices of rank as will be described later, but to illustrate the underlying methods, examples involving a choice between two ranks are used.

By taking into account the equalizer post SNR, a pre-calculation is performed. This additional computational process may be simplified in order to reduce the complexity and also the latency of the whole process. By indirectly using the Eigen value decomposition of the channel row correlation ($HH^H$), the channel capacity calculation for MIMO and TxDiversity can be further simplified such that their difference can be given by:

$$\log_2\left(\frac{1 + \text{trace}(HH^H)SNR + \det(HH^H)SNR^2}{1 + \text{trace}(HH^H)SNR}\right)$$

In the instance where the hardware allows a maximum of two ranks, the rank indication is a hard decision between 1 and 2 and may be done using a threshold $T_{cap}$, simplifying to:

$$\det(HH^H)SNR^2 - (2^{T_{cap}} - 1)(1 + \text{trace}(HH^H)SNR) > 0$$

For simplification, the representation $(2^{T_{cap}} - 1)(1 + \text{trace}(HH^H)SNR)$ is substituted by $fct_T(H, SNR, T_{cap})$, and using the above relations a new representation of the rank indication may be used:

$$RI = \text{rank}(HH^H)$$
$$= \begin{cases} 1 & \text{if } \det(HH^H)SNR^2 - fct_T(H, SNR, T_{cap}) \leq 0 \\ 2 & \text{if } \det(HH^H)SNR^2 - fct_T(H, SNR, T_{cap}) > 0 \end{cases}$$

In this relation, the function $fct_T(H, SNR, T_{cap})$ represents a 'parameterizable threshold function' for the rank indication. This threshold function may also include the performance loss of the implemented detector type and is pre-calculated where the results are stored in a look-up-table. This approach offers a simple and faster RI process compared with the previous RI strategies because the post-SNR is not calculated each time, but looked up instead.

Therefore this allows for a simple, fast decision to be made as to whether rank 1 or rank 2 should be used. In one embodiment, when there is a low SNR and it is unlikely that MIMO would be supported, this quick pre-calculation can be performed to confirm that rank 1 should be used, rather than search through all the capacities of higher ranks.

Figure 2:
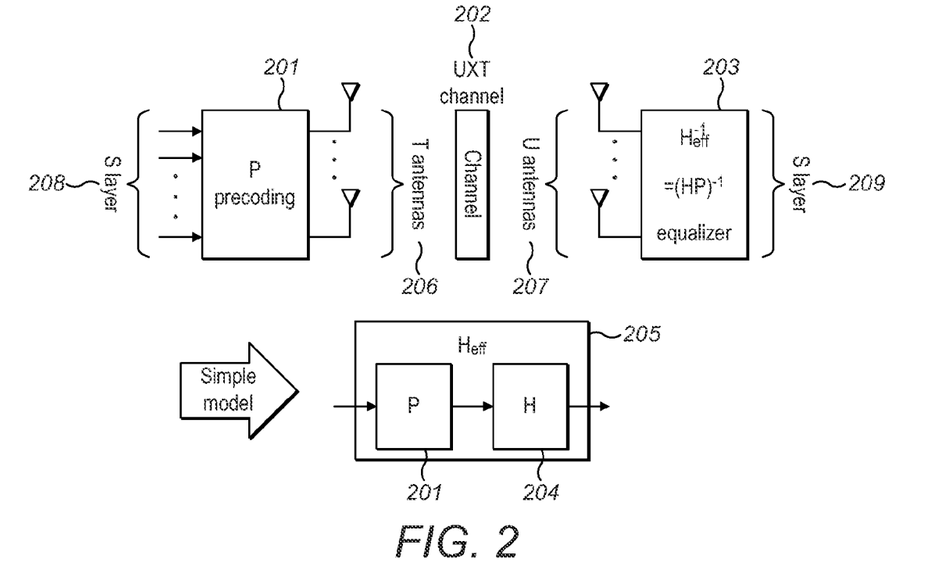
FIG. 2 illustrates the influence of the precoding to a communication system.

FIG. 2 illustrates how precoding affects the communication system. The precoding 201 distributes the S layers 208 to the T transmitting antennas 206 with different weightings. As this precoding step 201 occurs before transmission through the channel to the receiver, the channel matrix 204 will be altered such that rather than S inputs, there will only be T inputs, therefore changing the original channel matrix 204. As a result, the signal sent over the channel 202 to the U antennas 207 of the receiver 203 is dependent on both the physical channel matrix and the precoding matrix. Therefore, in order to take precoding 201 into account, an effective channel matrix 205 is considered instead of the physical channel matrix. The effective channel matrix 205 is given by multiplying the transmitter signal with the i-th precoding matrix index $P_i$ at the transmitter end. As such, the channel capacity calculations are modified to use the effective channel capacity 205 given by:

$$H_{eff,SM,i} = HP_{SM,i} \text{ where } i = 1, \ldots, N_P$$

$$h_{eff,TxDiversity,i} = HP_{TxDiversity,i} \text{ where } i = 1, \ldots, N_P$$

The calculations for channel capacity simply substitute the H 204 with $H_{eff}$ 205, to include the effects of precoding. Therefore the resulting MIMO and TxDiversity capacities are:

$$Cap_{MIMO,i} = \log_2\left(\det\left(I + \frac{E_s}{M_T N_0} H_{eff,SM,i} H^H_{eff,SM,i}\right)\right),$$
$$i = 1, \ldots, N_P$$

$$Cap_{TxDiversity,i} = \log_2\left(1 + h^2_{eff,TxDiversity,i} \frac{E_s}{M_T N_0}\right),$$
$$i = 1, \ldots, N_P$$

Figure 3:
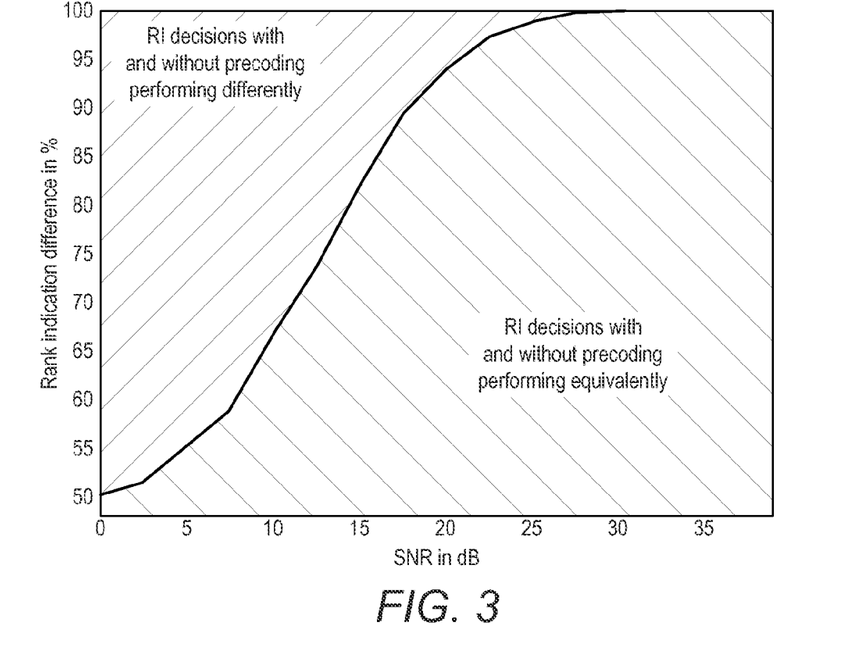
FIG. 3 shows the differences in rank indication between rank indication approaches with and without precoding taken into account.

FIG. 3 demonstrates the importance of including precoding in the calculation of channel capacities. Above an SNR or 30 dB in the medium correlation case, including precoding in the calculations has no effect on rank indication. However, as SNR drops below 30 dB, the rank indication diverges from the rank indication including strategies that take precoding into account. Therefore for low SNR, the precoding calculation cannot be skipped to improve computational efficiency without reducing the accuracy of the rank indication.

The above method, which combines rank and precoding calculations, can be further adapted for when the hardware of the wireless network is capable of ranks greater than 2. Each transmission mode (TxDiversity, MIMO rank=2, MIMO rank=3 etc.) use different precoding matrices depending on the rank and so the number of used layers for that transmission mode changes. Therefore there will be a separate set of channel capacities calculated for each transmission mode:

$$Cap = \{Cap_{TxDiv}, Cap_{MIMO,Rank=2}, Cap_{MIMO,Rank=3}, \ldots, Cap_{MIMO,min(T,U)}\}$$

As the robustness for each of these modes are not equal, each capacity above rank=1 includes a rank dependent penalty (loss):

$$Cap = \{Cap_{TxDiv}, Cap_{MIMO,Rank=2} - T_2, Cap_{MIMO,Rank=3} - T_3, \ldots, Cap_{MIMO,min(T,U)} - T_{min(T,U)}\}$$

These penalty levels may be fixed or adaptive and are found from statistical models or simulations.

From this list of calculated channel capacities, the best M of these candidates are selected for the next processing stage, where CQI is estimated.

Figure 4:
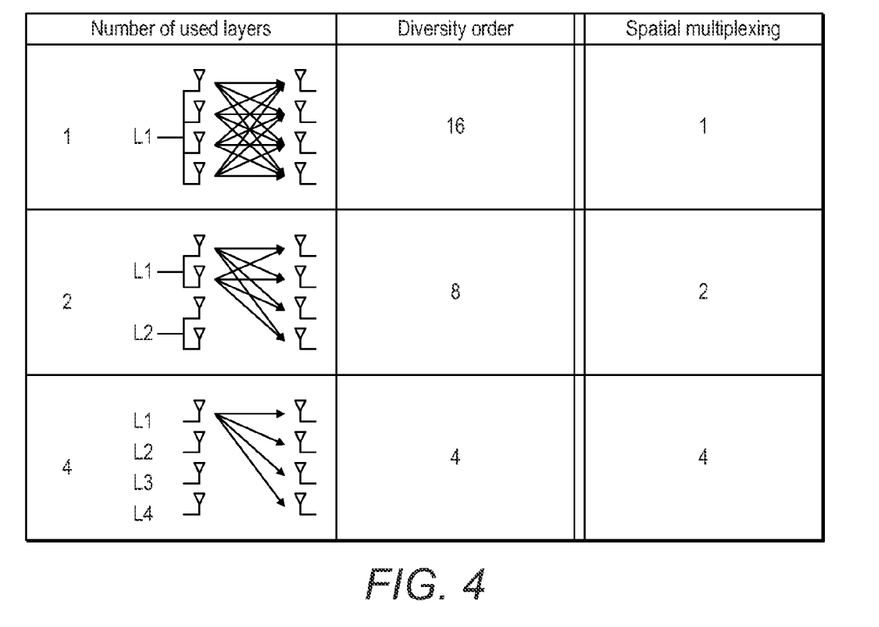
FIG. 4 illustrates the relationship between diversity order and spatial multiplexing order.

When sorting the capacities of all the ranks, it is normally the rank that determines the order. As illustrated in FIG. 4, this is due to the fact that the diversity order of each TX mode decreases as the number of layers increase (i.e the rank) for different data streams, whereas the spatial multiplexing gain increases with the number of used layers for different data streams. So with more layers used, there is greater spatial multiplexing, leading to a larger quantity of data that can be sent, and as diversity order decreases the robustness does as well, as fewer repeated signals sent. As an example, the final order of the resulting capacities may show that the maximum capacity for each rank increases up to a certain rank i, at which point the maximum capacity for each rank actually decreases, because at rank i the spatial multiplexing is high enough to achieve a large data rate without the diversity order being so low as to reduce the reliability and therefore start reducing the data rate.

With this knowledge, the proposed approach can be further improved. As it is expected that each successive increase in rank will result in an increase in the maximum channel capacity for that rank, when there is actually a decrease in the maximum channel capacity, it is known that any further increase in rank will only result in further decreases in maximum channel capacity. Therefore, the search process for better capacities in higher ranks can be stopped early. Alternatively, in the case where the channel capacities are similar, the search process can be brought to a lower priority rather than terminated outright, such that is allocated fewer system resources.

Figure 5A:
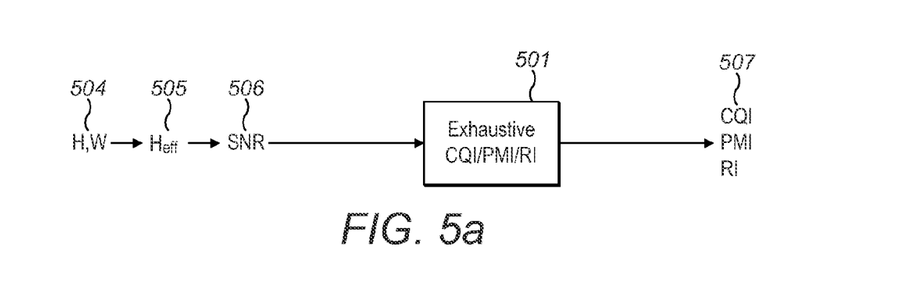
FIG. 5a shows a high level block diagram of the exhaustive search approach.
Figure 5B:
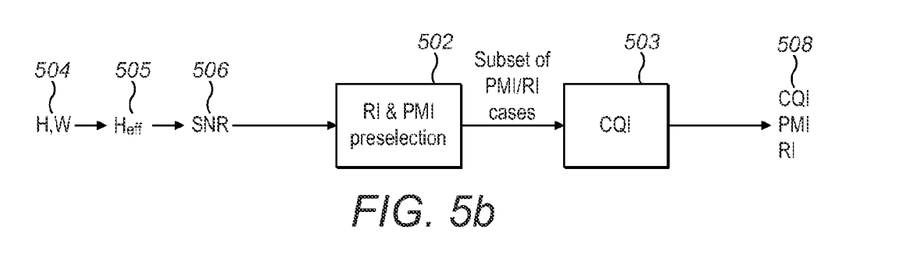
FIG. 5b shows a high level block diagram of the proposed approach.

FIGS. 5a and 5b illustrate a high level difference between the proposed approach and the joint CQI/PMI/RI approach (exhaustive search). While in the exhaustive approach 501 shown in FIG. 5a, every possible combination of CQI, PMI and RI are used to determine the best combination of values 507, the proposed approach, as shown in FIG. 5b, performs a preselection of RI and PMI first 502, sends a subset of these cases to the CQI generator 503 where the best combination of CQI and the subset of PMI and RI values 508 is determined This subset contains only M values, where M is some predetermined integer. The illustrated methods can use the starting point of determining the channel matrix and precoding matrix 504, which are used to calculate the effective channel matrix 505, which itself is used to determine the SNR 506.

Figure 6:
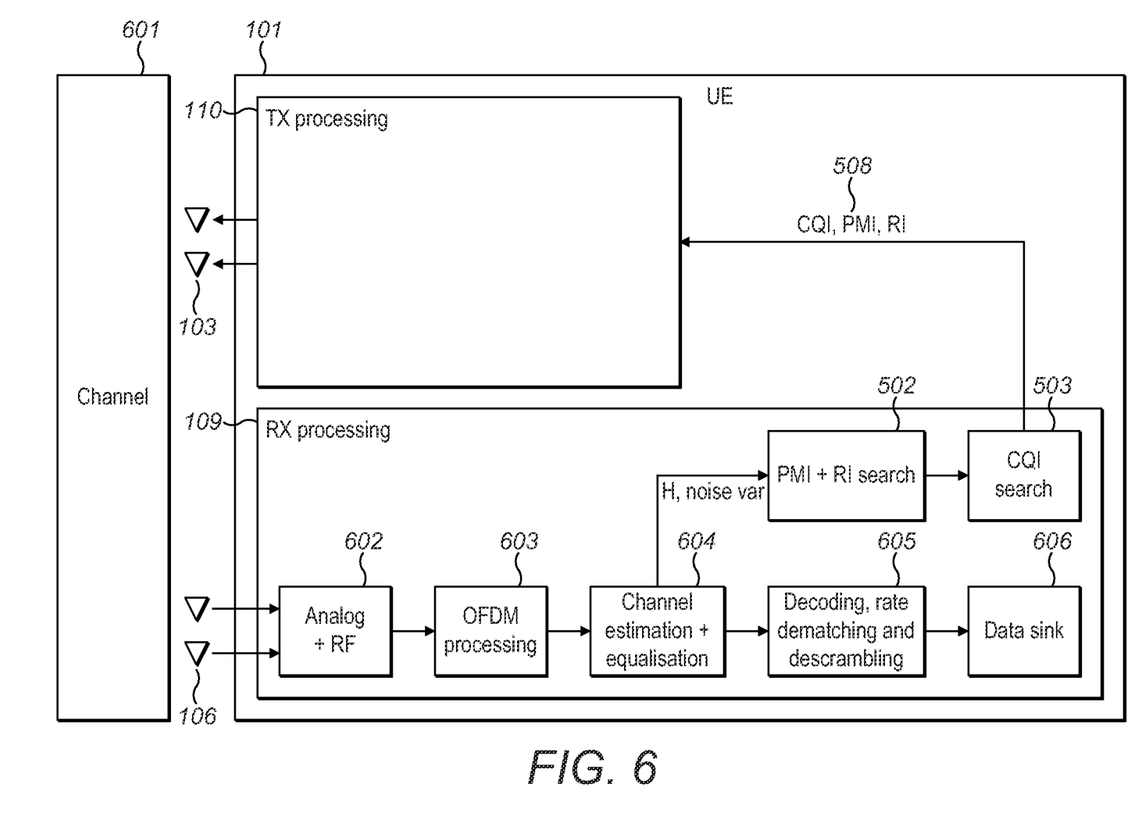
FIG. 6 is a simplified block diagram of the processes performed in a UE incorporating the proposed approach.

FIG. 6 shows the UE 101 of FIG. 1 which has been modified to implement the proposed approach for determining CSI shown in FIG. 5b. Here a signal is received from the eNb 102 through the channel 601 by the receiver antennas 106 of the UE 101. The raw signal passes through an analogue and RF stage 602 before proceeding through OFDM processing 603. At stage 604, channel estimation and equalisation is performed to estimate the H matrices and noise variance of the received signal. The useful data within the signal is further processed by continuing to stage 605 where the signal is decoded and rate dematching and descrambling is performed, before the final data is extracted to the data sink 606. The estimated H matrices and noise variance found in 604 are passed to the PMI and RI search stage 502. Here the M PMI and RI values associated with the M best channel capacities are determined and are used when determining the optimum CQI at stage 503. Once the optimum combination of CQI, PMI and RI 508 are determined, they are passed to the TX processing stage 110 where they will be fed back to the eNb 102 through the channel 601 via the UE's 101 transmit antenna(s) 103. All three values of CQI, PMI and RI 508 do not necessarily have to be fed back to the eNb 102 at the same time. For example, the RI values does not have to be sent at the same time as the CQI and PMI values as typically, RI can be reported less often as the appropriate number of layers normally varies on a slower basis than the channel variations that impact the choice of precoder matrix and MCS.

Figure 7:
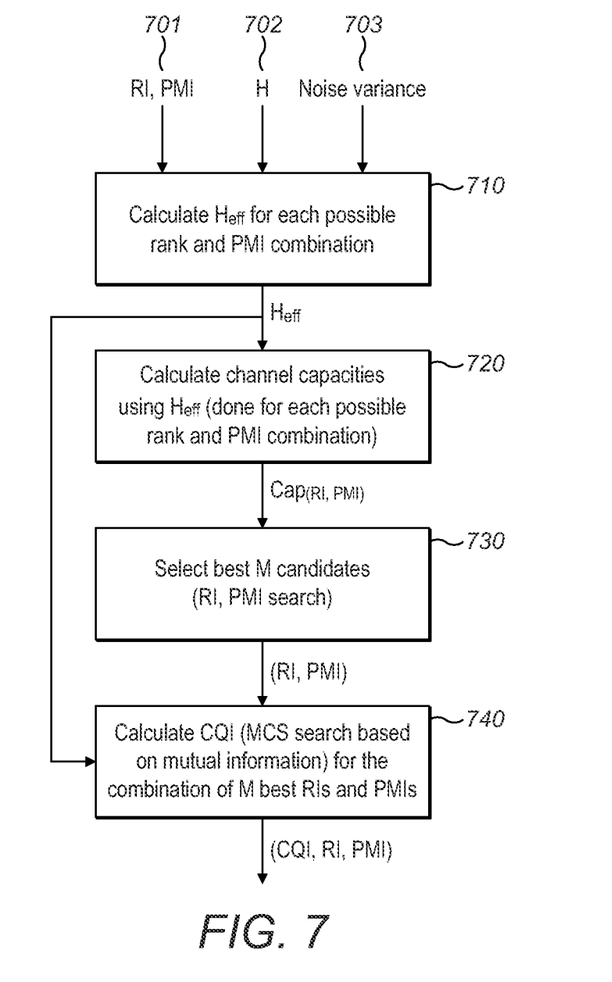
FIG. 7 is a flow chart visualising the proposed method of estimating CSI.

FIG. 7 shows a more detailed flow chart visualising the steps involved in the proposed method of determining CSI. At step 710, on receiving estimated channel matrices H 702, noise variances 703 and all the RIs and PMIs 701 available, effective channel matrices $H_{\text{eff}}$ are calculated for each possible combination of rank and PMI. These effective channel matrices are used in step 720 where channel capacities are calculated for each of the possible combinations of rank and PMI. All these channel capacities are then processed in step 730, where the best M of these channel capacities are selected and the corresponding RI and PMI values are processed in step 740. At step 740 the from these M RI and PMI values, the optimum combination of CQI, RI and PMI is selected so as to achieve the maximum data rate while keeping the BLER below a certain threshold (in the case of LTE, 10%).

To illustrate an exemplary implementation of the proposed approach, we provide the following scenario:

In this scenario, a wireless network supports up to a maximum of rank=4 and there are 16 different PMI's possible per layer, resulting in 64 different PMI cases in total. In this scenario, there is a 20 MHz bandwidth, corresponding to 1,200 subcarriers. If an H matrix is provided for every $3^{rd}$ subcarrier, there will be 400 H matrixes available for processing per subframe.

As a result, step 710 will multiple the 400 H matrices with the 64 PMI cases to calculate 25,600 effective channel matrices. For each of the individual PMI, the 400 effective channel matrices result in 400 SNR values.

At step 720 the capacities for these 400 SNR and effective channel matrices are calculated and accumulated into a single theoretical channel capacity value per PMI, resulting in 16 theoretical channel capacities calculated per rank.

At step 730, a subset of M of these calculated theoretical channel capacities are selected. The manner of this selection is described later. In this scenario M is chosen to be 8 and it is the highest M channel capacities that are selected for this subset.

At step 740, the RI and PMI values associated with these M selected channel capacities are passed on for further processing to find the optimum CQI index. This involves mapping the SNR values associated with these values to an "SNR-to-RBIR" table which represents the curves for QPSK, QAM16 and QAM64 modulation to form RBIR triplets. Data rates are calculated for each of these RBIR triplets and the combination of CQI, RI and PMI associated with the highest data rate with a BLER less than or equal to 10% is selected.

If this same scenario were performed with an exhaustive search approach, the number of PMI/RI candidates selected for CQI post processing would be 64, rather than the M for the proposed approach.

In step 720 of FIG. 7, while the exhaustive search approach calculates the received bit mutual information rate (RBIR) from the combinations of rank and PMI, the proposed approach calculates channel capacity instead from the combinations of rank and PMI. As seen from the above examples, calculating channel capacities requires fewer computations than calculating RBIRs as they do not take modulation order into account. Unlike the exhaustive search approach, the RI and PMI search is separated from the CQI calculation and therefore there is no need to consider modulation order at the RI/PMI search stage, thus improving computational efficiency. Once a limited subset of RI/PMI values has been found, the mutual information can then be used to determine an optimum combination of CQI/PMI/RI values. The term 'optimum' is not limited to mean the absolute best combination of CQI/PMI/RI, but rather, given the information available, what the system estimates the best combination to be. The proposed approach uses a maximum likelihood estimation and attempts to find an optimum or close to optimum combination without going through every possible combination.

Figure 8:
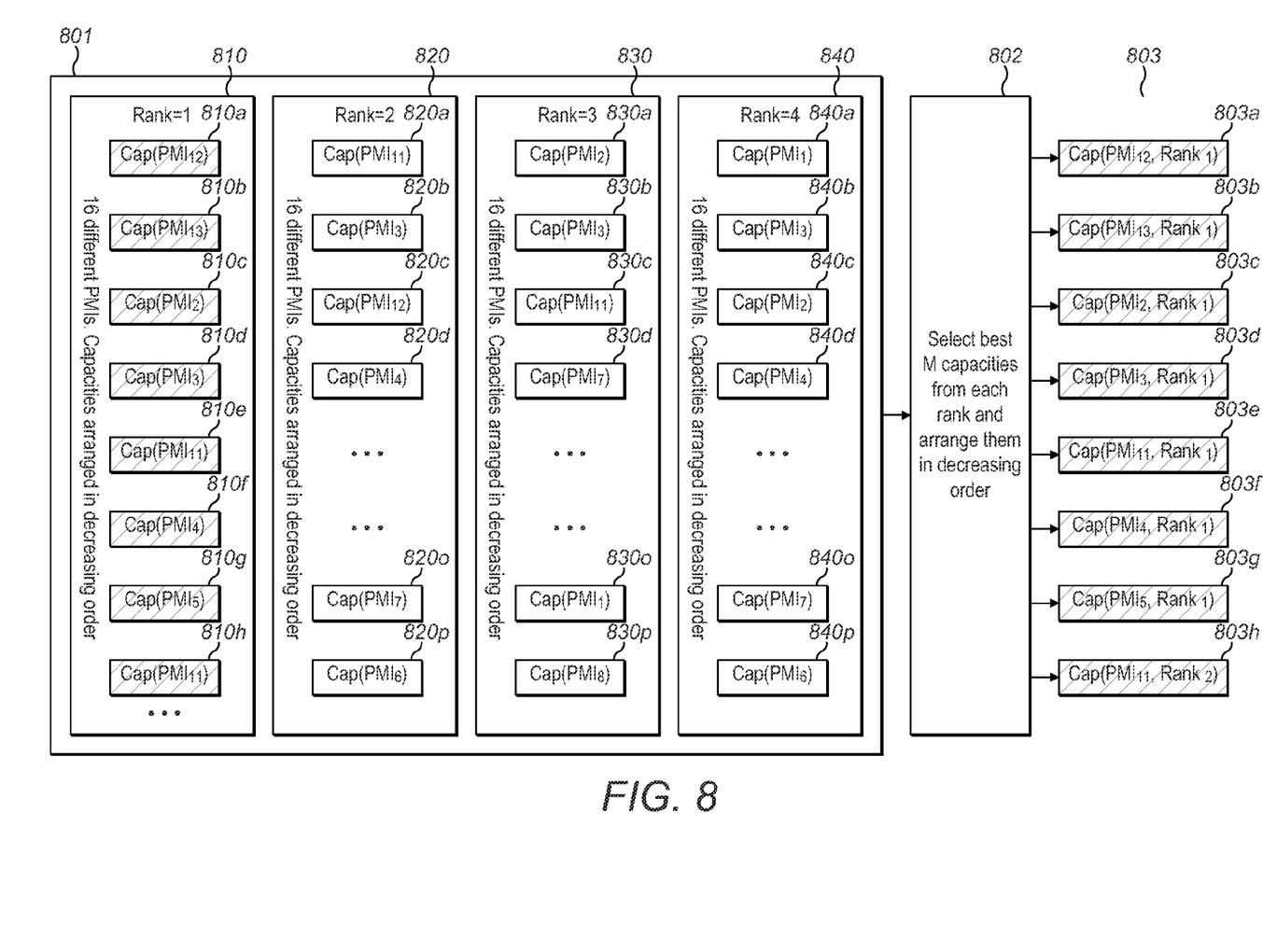
FIG. 8 illustrates a proposed method of selecting M channel capacities, in which the best M capacities are chosen.

At step 730 of FIG. 7, the best M candidates for RI and PMI are selected. One method of selecting the best M candidates is to pick the highest M calculated capacities, regardless of their rank and send them on to the CQI calculation stage. FIG. 8 illustrates this process where, from a selection of all calculated capacities 801, the selection stage 802 picks out the best M capacities 803a to 803h for sending on to the CQI generator. In the example illustrated in FIG. 8, there are 16 different PMIs for each rank, and therefore there are 16 calculated channel capacities for rank=1 (810), rank=2 (820), rank=3 (830) and rank=4 (840). However, using this method, there is a possibility that the highest calculated channel capacities are all in one rank, specifically rank=1. FIG. 8 illustrates such an instance, where all M=8 candidates selected (803a to 803h) are from rank 1 (810a to 810h) as these were the highest capacities calculated. In the scenario where this occurs, unnecessary calculations of higher ranks can be avoided using methods disclosed earlier, involving checking if the highest channel capacity of rank=2 is less than the highest channel capacity of rank=1, in which case calculations of channel capacities for higher ranks like rank=3 or 4 should be skipped or lowered in priority.

Figure 9:
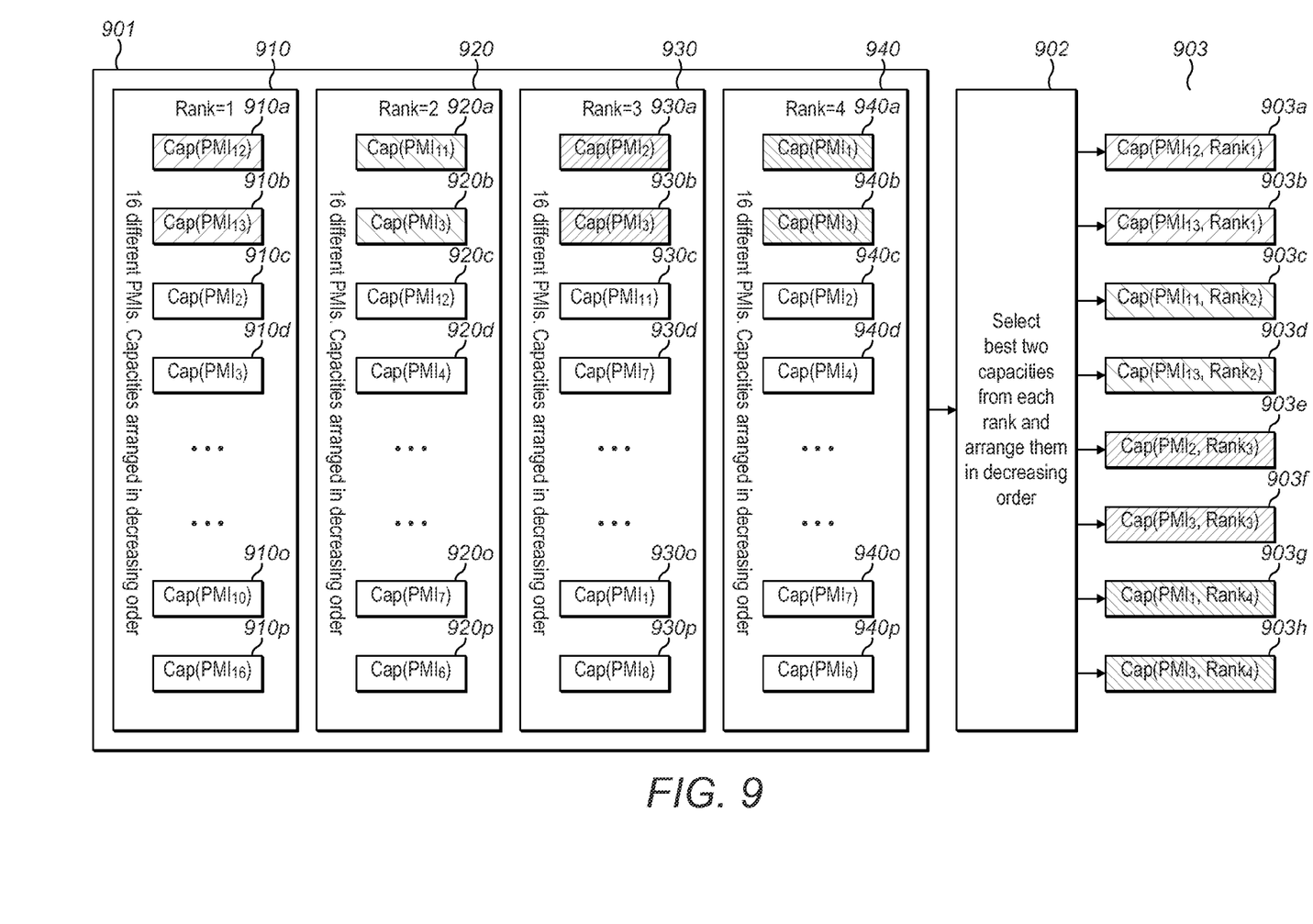
FIG. 9 illustrates a proposed method of selecting M channel capacities, in which the best M-by-N capacities from each rank are selected; and, FIG. 10 illustrates a proposed method of selecting M channel capacities, in which the best M-minus-N capacities are chosen from Rank 1.

An alternative method, referred to in this application as the "Best M by N" method is illustrated in FIG. 9. With this method only the best M÷N capacities of each rank are selected at the selection stage 902, so that there is an even distribution of channel capacities selected from the ranks. As shown in FIG. 9, where N=4 and M=8, the top two capacities from each rank are selected (910a, 910b, 920a, 920b, 930a, 930b, 940a, 940b), thus avoiding the scenario where all the selected capacities are from a single rank.

Figure 10:
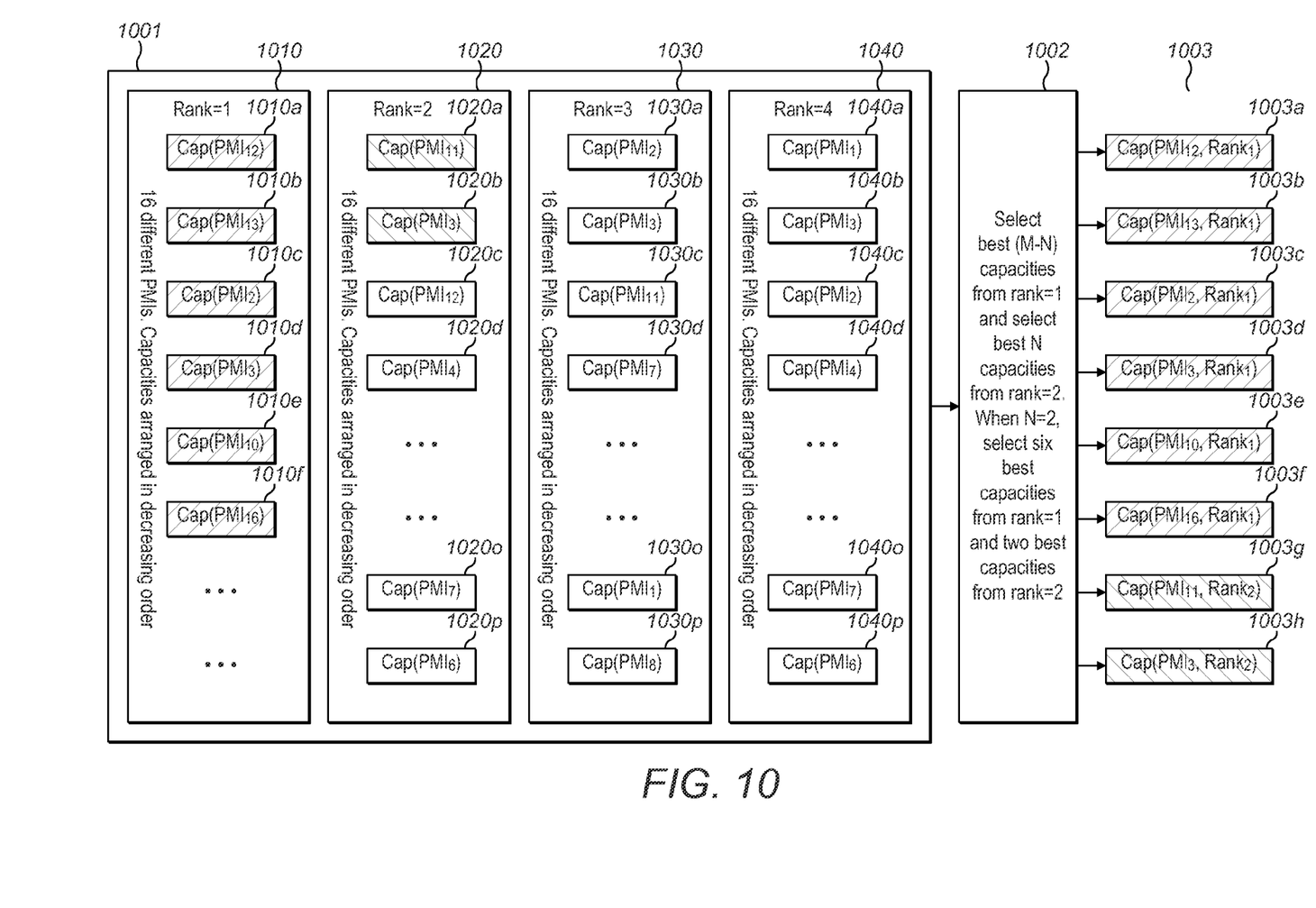

A further alternative for selecting M candidates is a mixture of the previous two and is illustrated in FIG. 10. In this method, the best (M minus N) capacities (1010a, 1010b, 1010c, 1010d, 1010e, 1010f) are selected only from rank 1 (1010), and the best N capacities from the remaining higher ranks are selected (1020a, 1020b) at the selection stage 1002. This method may be further modified such that the best N capacities are selected from specific ranks rather than any of the higher ranks, for example selecting N only from rank 2 as demonstrated in FIG. 10, where M=8 and N=2. This method ensures that not all the candidates selected are from the same rank, but imposes a bias as to which rank to select from.

In the instance where the value for M is chosen to be the same as the total number of calculated channel capacities, an advantage of the proposed approach over the exhaustive search of previous approaches is lost. Therefore M is chosen to be less than the total number of calculated channel capacities.

Additionally, M could be chosen to be 1, such that only the best combination of PMI and RI is used for calculating the CQI. However, such a value for M would result in a less accurate overall result. Therefore M should be chosen to be greater than 1 and less than the total number of calculated channel capacities. By choosing M to be greater than 1, it ensures that the CQI search is given a choice of PMIs and RIs to use and thus improving the accuracy of the resultant CSI.

By ensuring that M is less than the total number of calculated theoretical channel capacities, the total number of calculations is reduced and therefore the process requires less processing power and time to determine CSI. As a large number of calculated channel capacities will be much lower than the highest channel capacities, having M set as the total number of channel capacities would waste processing power on PMI and RI candidates that have little chance of resulting in the optimum set of CQI, PMI and RI values.

What is claimed is:

1. A method of estimating channel state information (CSI) for a communication channel comprising:
    calculating a number of theoretical channel capacities using a plurality of combinations of values of an indicator of rank and an indicator of precoding;
    selecting a plurality M of said theoretical channel capacities and their associated values of the indicator of rank and of indicator of precoding; and,
    determining the optimum combination of values of an indicator of channel quality, the indicator of rank and indicator of precoding, from the selected M values of the indicator of rank and indicator of precoding.

2. The method of claim 1, wherein the step of calculating theoretical channel capacities comprises calculating effective channel matrices from said combinations of values of the indicator of rank and indicator of precoding.

3. The method of claim 1, wherein the step of calculating theoretical channel capacities is dependent on post-detector SNR values.

4. The method of claim 1, wherein the M theoretical channel capacities are the largest M theoretical channel capacities.

5. The method of claim 1, wherein the M theoretical channel capacities are the largest M/N capacities from each rank, where N≤M.

6. The method of claim 1, wherein the M theoretical channel capacities includes the largest M-N capacities from a specified rank and the remaining largest N capacities from adjacent ranks, where N<M.

7. The method of claim 1, wherein M is greater than 1 and less than the total number of theoretical channel capacities.

8. The method of claim 1, wherein determining the optimum combination of values of the indicator of channel quality, indicator of rank and indicator of precoding comprises performing a modulation coding scheme (MCS) search and finding the values of the indicator of channel quality, indicator of rank and indicator of precoding associated with the maximum data rate and an error rate below a predetermined threshold.

9. The method of claim 8, wherein the MCS search is performed on the M theoretical channel capacities in decreasing order.

10. The method of claim 1, wherein the step of calculating theoretical channel capacities is terminated if the highest theoretical channel capacity associated with rank i+1 is lower than the highest theoretical channel capacity associated with rank i.

11. The method of claim 1, wherein the step of calculating theoretical channel capacities comprises utilising pre-calculated results stored in a look-up table.

12. The method of claim 1, further comprising the step of transmitting the determined optimum combination of values.

13. A method according to claim 1, when implemented by a user equipment connected to a wireless LTE network.

14. The method of claim 1, wherein the indicator of rank is rank indication (RI), the indicator of precoding is a precoding matrix index (PMI) and the indicator of channel quality is channel quality indicator (CQI).

15. A user equipment comprising:
    one or more processors configured to:
        calculate a number of theoretical channel capacities using a plurality of combinations of values of an indicator of rank and an indicator of precoding;
        select a plurality M of said theoretical channel capacities and their associated values of the indicator of rank and indicator of precoding; and,
        determine the optimum combination of values of an indicator of channel quality, the indicator of rank and indicator of precoding, from the selected M values of the indicator of rank and indicator of precoding.

16. The user equipment of claim 15, wherein the one or more processors configured to calculate theoretical channel capacities comprises the one or more processors configured to calculate effective channel matrices from said combinations of values of the indicator of rank and indicator of precoding.

17. The user equipment of claim 15, wherein the step of calculating theoretical channel capacities is dependent on post-detector SNR values.

18. The user equipment of claim 15, wherein the M theoretical channel capacities are the largest M theoretical channel capacities.

19. The user equipment of claim 15, wherein the M theoretical channel capacities are the largest M/N capacities from each rank, where N≤M.

20. The user equipment of claim 15, wherein the M theoretical channel capacities includes the largest M-N capacities from a specified rank and the remaining largest N capacities from adjacent ranks, where N<M.

21. The user equipment of claim 15, wherein M is greater than 1 and less than the total number of theoretical channel capacities.

22. The user equipment of claim 15, wherein the one or more processors configured to determine the optimum combination of values of the indicator of channel quality, indicator of rank and indicator of precoding comprises the one or more processors configured to perform a modulation coding scheme (MCS) search and finding the values of the indicator of channel quality, indicator of rank and indicator of precoding associated with the maximum data rate and an error rate below a predetermined threshold.

23. The user equipment of claim 22, wherein the MCS search is performed on the M theoretical channel capacities in decreasing order.

24. The user equipment of claim 15, wherein the one or more processors configured to calculate theoretical channel capacities is terminated if the highest theoretical channel capacity associated with rank i+1 is lower than the highest theoretical channel capacity associated with rank i.

25. The user equipment of claim 15, wherein the step of calculating theoretical channel capacities comprises utilising pre-calculated results stored in a look-up table.

26. The user equipment of claim 15, the one or more processors further configured to transmit the determined optimum combination of values.

27. The user equipment of claim 15, wherein the indicator of rank is rank indication (RI), the indicator of precoding is a precoding matrix index (PMI) and the indicator of channel quality is channel quality indicator (CQI).

* * * * *